Figure 1:
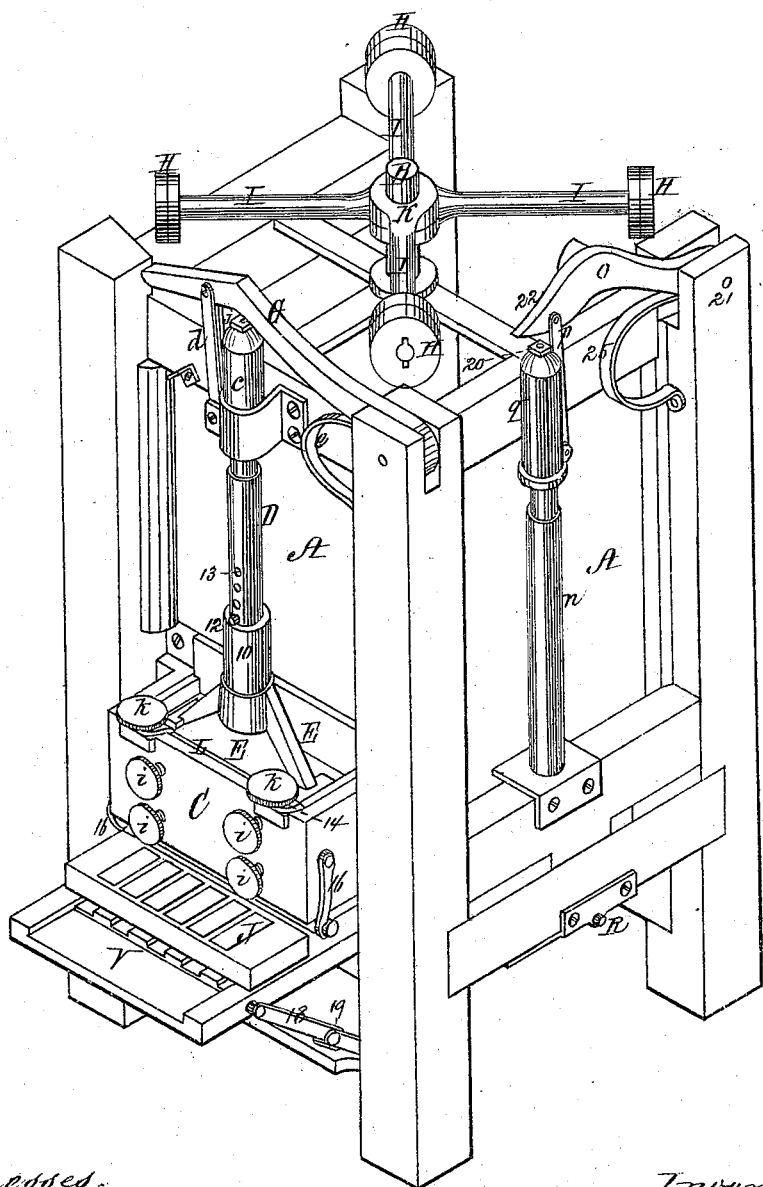

3 Sheets--Sheet 1.

A. ELLIOT & J. O. WOODWARD.
Brick-Machines.

No. 143,972.

Patented Oct. 28, 1873.

Witnesses,
Wm Menemakuhl
W. J. Cambridge

Inventors,
Atrial Elliot
and
James O. Woodward
Per his Attorneys
Teschemacher & Stearns 3 Sheets--Sheet 2.
A. ELLIOT & J. O. WOODWARD.
Brick-Machines.
No. 143,972.  *Fig. 2.*  Patented Oct. 28, 1873.
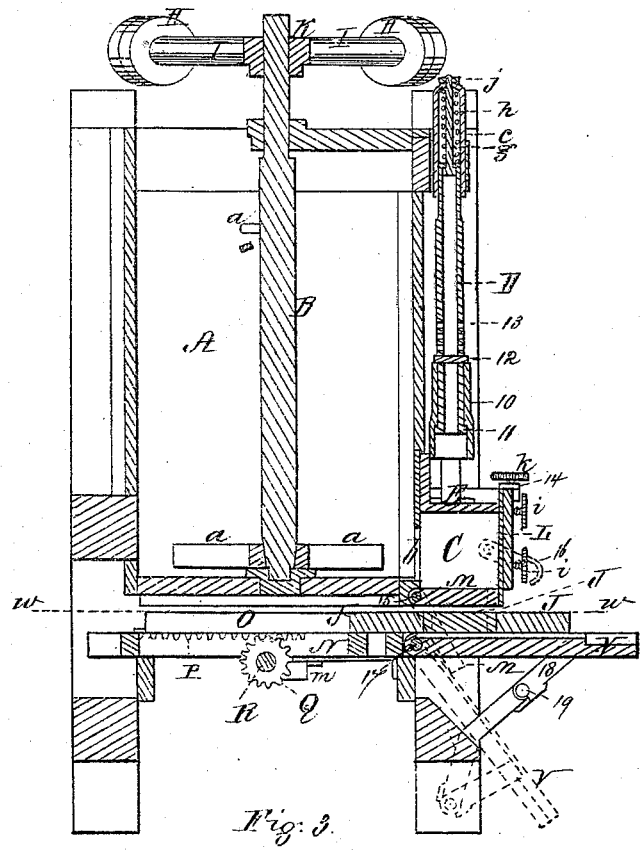
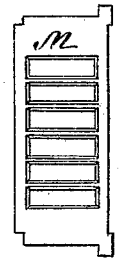
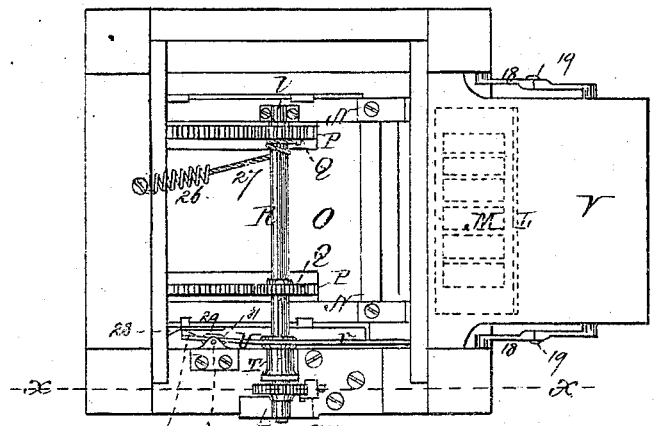
Witnesses,  Inventors,
  Arial Elliot
  and
  James O. Woodward
  Per his Attorneys,
  Teschemacher & Stearns 3 Sheets--Sheet 3.
A. ELLIOT & J. O. WOODWARD.
Brick-Machines.
No. 143,972. Patented Oct. 28, 1873.
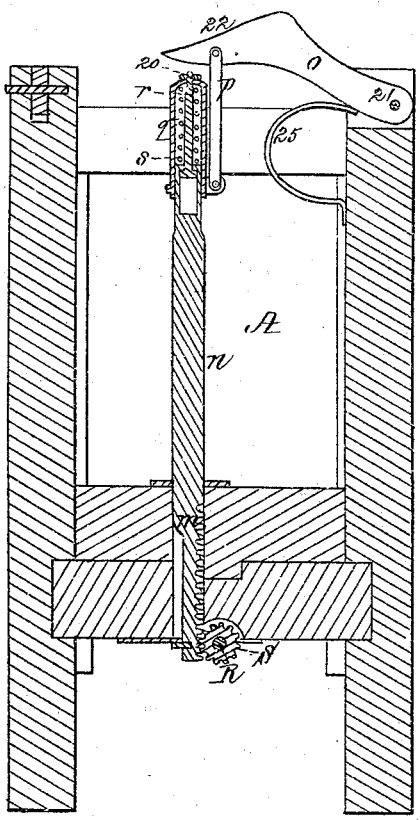
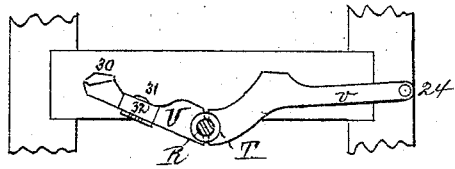
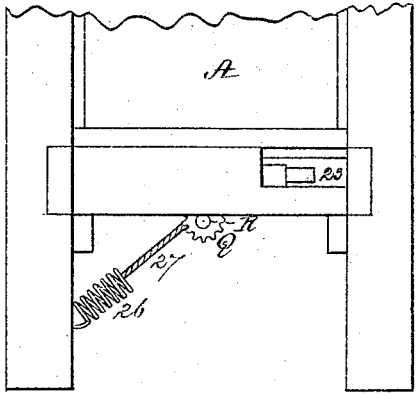
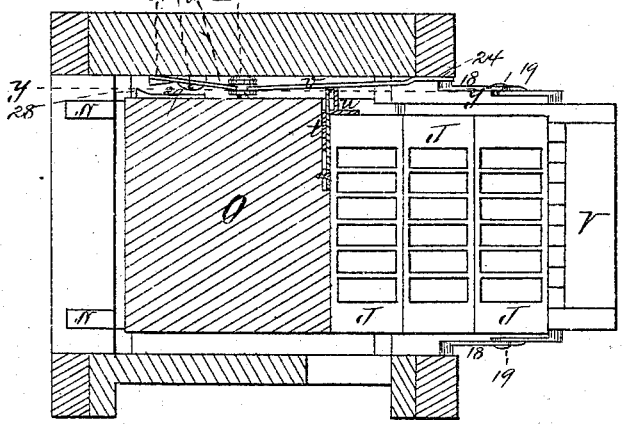
Witnesses,
Wm Mewenstuhl
W. J. Cambridge
Inventors,
Abial Elliot
and
James O. Woodward,
Per his Attorneys,
Teschemacher & Stearns

UNITED STATES PATENT OFFICE.

ABIAL ELLIOT AND JAMES O. WOODWARD, OF TAUNTON, MASSACHUSETTS.

IMPROVEMENT IN BRICK-MACHINES.

Specification forming part of Letters Patent No. 143,972, dated October 28, 1873; application filed April 28, 1873.

*To all whom it may concern:*

Be it known that we, ABIAL ELLIOT and JAMES O. WOODWARD, of Taunton, in the county of Bristol and State of Massachusetts, have invented certain Improvements in Machines for Molding Bricks, of which the following is a full, clear, and exact description, reference being had to the accompanying drawings, making part of this specification, in which—

Figure 1 is a perspective view of a brick-machine constructed in accordance with our invention. Fig. 2 is a vertical section through the center of the same. Fig. 3 is a plan of the under side of the same. Fig. 4 is a vertical section on the line $x\ x$ of Fig. 3. Fig. 5 is a side elevation of the lower portion of the machine. Fig. 6 is a horizontal section on line $w\ w$ of Fig. 2; Fig. 7, sectional detail on the line $y\ y$ of Fig. 6. Fig. 8 is a plan of the "false mold" or "clog-cutter" detached.

In machines for molding bricks, as heretofore constructed, the mold has been carried forward under the plunger by a sliding carriage having a regular reciprocating motion; and if the mold was not pushed in quite far enough, to its exact position, it would be broken when carried forward.

The first portion of our invention has for its object to obviate this difficulty, and consists in a carriage which remains stationary until the mold reaches its proper position, and comes in contact with a slide, lever, or other device connected with mechanism which engages with and moves the carriage forward against the mold, to deliver it under the plunger as required, the carriage being inoperative till the mold is correctly placed, thereby preventing the possibility of its being broken or injured in its passage through the machine.

The second portion of our invention has for its purpose to overcome this objection, and consists in providing the expressing-chamber with a pivoted bottom or false mold, which may readily be swung down when obstructed, and is locked in position under the chamber by means of one or more hooks or catches when the plunger is in operation. Our invention also consists in a spring applied to the shaft which operates the reciprocating carriage, so that, should a stone obstruct the mold under the plunger, the spring will yield so as to avoid the breakage of the mold or other parts of the machine.

To enable others skilled in the art to understand and use our invention, we will proceed to describe the manner in which we have carried it out.

In the said drawings, A represents a box or receptacle for containing the clay to be converted into bricks. A vertical shaft, B, supported in suitable bearings, extends up through the center of the receptacle A, and is provided with a series of radial arms or blades, $a$, for mixing and tempering the clay, the arms or blades being so constructed and arranged as to assist in forcing the clay down into the compressing-chamber C, which communicates by a passage, $b$, with the bottom of the receptacle, and is situated in front thereof. D is a vertical shaft, the bottom of which passes through the upper portion 10 of the plunger E, which fits the interior of the expressing-chamber. This shaft D is made to slide within the portion 10, and is provided at its lower end with a head, 11, which rests against a shoulder on the inside of the portion 10, by which construction the upward motion of the shaft is imparted thereto to raise the plunger. The downward motion of the shaft D is communicated to the plunger E by a pin, 12, fitted into one of a series of holes, 13, in the shaft, and strikes against the top of the portion 10. By adjusting the position of the pin from one hole to another the amount of downward motion of the plunger within the expressing-chamber may be increased or diminished to regulate the degree of pressure employed in forcing the clay into the molds. The upper end of the shaft D is surrounded by a cylindrical casing, $c$, connected by a link, $d$, with the inclined end of a lever, G, pivoted to the frame-work, the plunger being periodically depressed by a series of rolls, H, secured to arms I projecting from a hub, K, fastened to the revolving shaft B, the plunger being elevated by a spring, $e$, secured to the frame-work and placed under the inner end of the lever G. The interior of this shaft D is hollow from top to bottom for the reception of a bolt, $g$, which projects through the top, above which it is surrounded by a spiral spring, $h$, the bottom of which rests on the top of the shaft, while the upper end of the spring bears against the under side of the top of the casing c, which incloses and keeps it in place. The size of the hole in the top of the shaft is sufficiently small to prevent the head of the bolt g from passing through it, and a hole is formed in the top of the casing c to allow the screw-portion of the bolt to project up through for a nut, j, to be fitted thereover, by which means the force of the spring may be readily regulated to do the required work, while the spring will yield on the downward stroke of the plunger should any additional strain be produced by a stone accidentally getting into the expressing-chamber, thus avoiding the breakage of the parts. Inside of the front of the expressing-chamber C is a plate, L, which serves as a packing for the plunger, and is made to fit snugly against it by turning the screws i, the lower edge of the plate projecting below the false mold N (Fig. 8) of the expressing-chamber, so as to serve as a scraper for smoothing off the top of the clay in the mold J as it passes under it out of the machine. The height of the lower edge of the plate L is regulated by screws k, which pass through projections, 14, formed at its top, and into and through projections on the outside of the upper edge of the expressing-chamber.

The false mold or clog-cutter M, Fig. 8, is pivoted at 15 to the under side of the expressing-chamber, and forms its bottom, which construction admits of its being readily swung down when obstructed, and when in position under the chamber it is locked by hooks or catches 16, which hold it firmly in place, as seen in the full lines in Fig. 1, when the plunger is in operation. V is a table or platform pivoted, at 17, to the front of a frame, N, situated under the receptacle A. This table is for supporting the molds J while being filled, and it may be swung down to remove a mold should a stone or other obstruction prevent it from being pressed forward; and by thus pivoting the table immediately in the rear of the expressing-chamber, instead of at the back of the machine, as has heretofore been customary, the empty mold immediately in front of the carriage O is not disturbed or displaced when the table is swung down to allow of the removal of an obstruction. The table V is supported by arms or braces 18 pivoted thereto and to the frame-work, and is provided with stop-joints 19, by pressing downwardly on which the braces may be folded and the table swung down, as seen dotted in Fig. 2.

We will now explain the manner in which the molds are placed within the machine, and the operations of filling them with clay and removing them.

The frame N serves as a track, upon which the carriage O is made to slide out and in by means of the following mechanism: On each side of the bottom of the carriage is secured a rack-bar, P, into which engages a cog-wheel, Q, fixed on a horizontal shaft, R, extending transversely under the carriage, and having its bearings at l. Loosely fitting on the shaft R, and near one end of the same, is another cog-wheel, S, with which engages a vertical rack-bar, m, formed at the lower end of a shaft, n, which is guided vertically by passing through a solid portion of the frame-work of the machine. The motion of the cog-wheel S is communicated to the shaft R by means of a clutch, T, operated by mechanism to be described. This shaft is of similar construction to the shaft D, and is connected with a lever, o, by a link, p, casing q, bolt r, and nut 20, exactly like the link d, casing c, bolt g, and nut j, the bolt r being also surrounded by a spiral spring, s, similar to that, h, surrounding the bolt g; this spring s yielding, if the movement of the carriage o should become obstructed, and thus avoiding the breakage or injury of the mechanism. The inner end of the lever o is pivoted at 21 to the frame-work, and is periodically depressed by the rolls H pressing down on the inclined portion 22 of its upper surface, when the rack m is also carried down, thus revolving the cog-wheels S and Q, and, through the connections above explained, moving the carriage O.

The empty molds J, Fig. 2, are successively introduced through an aperture, 23, Fig. 5, in one side of the machine to a position on the frame N in front of the carriage, each mold being pushed forward thereby immediately under the plunger of the expressing-chamber, by which it is filled with clay, after which it is brought forward to the front of the table V, from which it is removed. Upon a metallic strip, t, at the farther side of the front of the carriage O, slides a metallic projection, u, against which the inner end of the mold after being entered through the aperture 23 strikes, when the mold is in the proper position to be advanced by the carriage under the plunger. When thus struck by the mold, the projection u is brought against an arm, v, one end of which is secured to the frame-work at 24, the other end being forked and embracing the grooved portion of the clutch T, which is thus thrown forward to connect the cog-wheel S with the shaft R, which is now revolved by the vertical rack-bar m, causing the carriage to move forward and push the mold J into place under the plunger E, after which the carriage is returned by the ascent of the shaft n, which is effected by a spring, 25, similar to that e, acting on the lever o, an auxiliary spring, 26, connected with the shaft R by a cord, 27, wound around it, being employed to assist the spring 25 in returning the carriage. Just before the carriage reaches the end of its traverse backward an inclined projection, 28, on an arm, 29, pivoted to the carriage, strikes against a projection, 30, on one end of a lever, U, pivoted at 31 to a plate, 32, secured to the frame-work, the opposite end of the lever being also forked or bifurcated and embracing the grooved portion of the clutch T, by which construction it is thrown out so as to disconnect the cog-wheel S from the shaft R, and also press the sliding projection $u$ into its previous position ready to be struck by the next mold J entered through the aperture 23.

From the foregoing it will be seen that the carriage remains at rest until brought into action by the mold itself when it reaches the proper position, and is ready to be carried forward, thus avoiding the frequent breakage of molds incident to the former construction, when the carriage was reciprocated at regular intervals.

The movements of the levers G $o$ and the shafts D $n$ are so timed, with respect to each other, that after one mold is filled with clay an empty mold will be carried forward under the expressing-chamber previous to the descent of the plunger, as required, and the shafts D $n$, if preferred, may be operated by mechanism of different construction to that shown.

It is also evident that any other suitable mechanism may be employed for reciprocating the carriage O instead of that shown, said mechanism being brought into action by a clutch, or equivalent device, acted on by the mold on reaching the proper position to be carried forward.

What we claim as our invention, and desire to secure by Letters Patent, is—

1. A reciprocating carriage, O, for advancing the empty mold under the expressing-chamber, in combination with mechanism for operating the carriage brought into action by the mold itself on reaching its proper position to be carried forward, substantially as and for the purpose described.

2. The false mold or clog-cutter M, in combination with the expressing-chamber C and fastenings 18, whereby obstructions may be removed from the expressing-chamber by allowing M to drop without taking the chamber apart or removing the plunger, as set forth.

3. The rod $n$, provided with the yielding spring $s$ and gear $m$ R, in combination with the carriage O, so as to allow it to yield when obstructed, as set forth.

Witness our hands this 26th day of April, 1873.

ABIAL ELLIOT.
JAMES O. WOODWARD.

In presence of—
P. E. TESCHEMACHER,
N. W. STEARNS.